United States Patent Office 2,955,113
Patented Oct. 4, 1960

2,955,113

ω-(1-ALKYL-PIPERIDYL-4)-ω-ACYL-HYDRAZINE DERIVATIVES

Ernst Jucker, Binningen, Basel-Land, Erwin Rissi, Basel, Rudolf Süess, Rheinfelden, Aargau, Arnold Vogel, Basel, and Eberhard Wolff, Riehen, near Basel, Switzerland, assignors to Sandoz Ltd., Basel, Switzerland No Drawing. Filed June 23, 1959, Ser. No. 822,189

Claims priority, application Switzerland June 12, 1957

6 Claims. (Cl. 260—294)

The present invention relates to ω-(1-alkyl-piperidyl-4)-ω-acyl-hydrazine derivatives which correspond to the formula

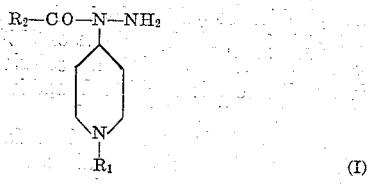

(I)

wherein $R_1$ is a lower alkyl group (e.g. methyl, ethyl, propyl, butyl, etc.), and $R_2$ is a member selected from the group consisting of methyl, ethyl, n-propyl, tert. butyl, n-pentyl-(1), n-pentyl-(3), phenyl, phenoxy and 2-benzyloxyphenyl.

The compounds (I) of the present invention may be severally prepared by reacting the corresponding (1-alkyl-piperidyl-4)-hydrazine of the formula

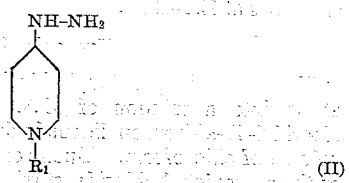

(II)

wherein $R_1$ is as previously defined, with an aliphatic oxo-compound (aldehyde or ketone), then acylating the resultant hydrazone by treatment with a reactive derivative of an organic carboxylic acid of the formula

$R_2$—COCl (III)

wherein $R_2$ is a previously defined, and splitting the alkylidene group from the so-obtained acylated hydrazone.

It will be seen that it is characteristic of the hydrazine compounds (I) of the present invention that they bear an acyl group and a 1-alkyl-piperidyl-4 group at one and the same nitrogen atom.

In preparing the new compounds, various aldehydes and ketones may be employed as aliphatic oxo-compound and it is advantageous that these be liquid at room temperature (20°–30° C.), so that in carrying out the reaction the hydrazine derivative (II) may be dissolved therein at such temperature or while cooling. Acetone is the preferred oxo-compound for this purpose. To complete the reaction, the temperature of the reaction mixture may be raised for a while. The desired hydrazone is obtained as a crude product upon evaporating the reaction mixture. Acylation of the hydrazone may be carried out without purification thereof.

For the acylation, the hydrazone is dissolved in an inert organic solvent, such for example as chloroform or tetrahydrofurane, and the acylating agent, for example acetyl chloride, is slowly added to the solution. The acylation reaction goes to completion in the cold or at room temperature. It is generally not necessary to heat the reaction mixture. After removal of acid byproducts from the reaction mixture, the desired acylated hydrazone can be recovered by evaporating off the solvent, and it can be purified by distillation under reduced pressure and/or recrystallization.

The alkylidene group is then split off from the acylated hydrazone under conditions leaving the N-acyl group intact. This is effected, according to the invention, by treating the acylated compound with alkanolic HCl in the cold or at room temperature, whereby the alkylidene group is split off smoothly, with no attack of the N-acyl group.

The new ω-(1-alkyl-piperidyl-4)-ω-acyl-hydrazine derivatives (I) of the present invention are basic compounds, which form—with inorganic or organic acids—stable salts which are crystalline at room temperature. The new compounds are useful for many purposes. They are very reactive keto reagents. With aldehydes or ketones, they form hydrazones which—due to their basic component—form water-soluble crystalline salts with acids. This property makes the compounds useful for detecting the presence of keto groups in cases where phenylhydrazine and its substitution products yield no crystalline hydrazones. The new hydrazines also possess interesting and useful therapeutic properties. They are also useful as intermediates for the preparation of therapeutically useful products. Thus, the compounds (I) can, for example, be reacted with a substituted malonic acid dichloride of the formula

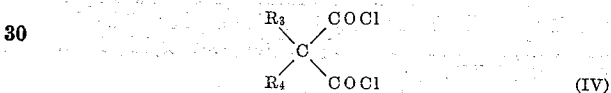

(IV)

wherein $R_3$ may e.g. be methyl, ethyl or n-butyl and $R_4$ may be ethyl, n-butyl or phenyl, to produce the corresponding compounds of the formula

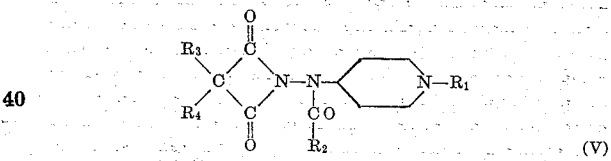

(V)

wherein $R_1$, $R_2$, $R_3$ and $R_4$ have the precedingly-indicated significances. Compounds (V) are characterized inter alia by their antiphlogistic and analgetic action and are useful in the treatment of chronic rheumatism, chronic rheumatic polyarthritis, etc.

The following examples set forth presently preferred embodiments of the invention. These examples are intended to be only illustrative in character and not at all restrictive of the scope of the invention. Parts and percentages are by weight, unless otherwise indicated; the relationship between parts by weight and parts by volume is the same as that between grams and milliliters. All temperatures are in degrees centrigrade; melting points and boiling points are uncorrected.

Example 1

100 parts of (1-methyl-piperidyl-4)-hydrazine are dissolved in 300 parts by volume of acetone, while cooling, after which the solution is boiled under reflux for ½ hour. Evaporation of the solution under reduced pressure then yields ω-(1-methyl-piperidyl-4)-ω'-isopropylidene-hydrazine in quantitative yield. On cooling, this compound crystallizes out in the form of needles. The so-obtained crude product need not be purified, but is directly acetylated.

For the acetylation, 52 parts by volume of acetyl chloride are added dropwise, while stirring and cooling (interior temperature 0–10°), to a solution of 112.7 parts of ω-(1-methyl-piperidyl-4)-ω'-isopropylidene-hydrazine. Upon completion of the addition of the acetylating agent, the solution is stirred for 4 more hours without cooling, after which it is cooled to 0°, washed with ice-cold aqueous caustic soda solution of 20% strength, dried over sodium sulfate, and evaporated under reduced pressure. The so-obtained residue is fractionated in high vacuum (pressure of 0.4 mm. Hg). After a small preliminary distillate, ω-(1-methyl-piperidyl-4)-ω-acetyl-ω'-isopropylidene-hydrazine passes over at 115–117° under the said pressure of 0.4 mm. Hg and is collected.

For characterization of the so-obtained product, a test specimen of the distillate is converted, by reaction with methanolic hydrochloric acid, into the hydrochloride, which, recrystallized from ethanol-acetone-ether, melts above 160° with decomposition (foaming). Analysis shows the product to be the dihydrochloride.

64.5 parts of ω-(1-methyl-piperidyl-4)-ω-acetyl-ω'-isopropylidene-hydrazine are dissolved in 300 parts by volume of 90% ethanol, after which hydrogen chloride is introduced into the solution, while cooling with ice, until the solution gives a strong acid reaction to Congo paper. The solution is then allowed to stand at room temperature for one hour, and then evaporated under reduced pressure (without heating strongly) until strong crystallization ensues. A solid cake is obtained, after the mixture has been allowed to stand for a short time. The so-obtained hydrochloride is filtered off, washed with ether, and dried under reduced pressure, after which it is suspended in chloroform and the free base liberated by the addition of ice cold, NaCl-saturated, aqueous caustic soda solution of 20% strength. The chloroform layer is dried over sodium sulfate and is then evaporated under reduced pressure. The residue from this evaporation is crystallized from ether-petroleum ether. The thus-obtained pure ω-(1-methyl-piperidyl-4)-ω-acetyl-hydrazine melts at 74–76°.

Example 2

To a solution of 52.06 parts of ω-(1-methyl-piperidyl-4)-ω'-isopropylidene-hydrazine (see Example 1) in 250 parts by volume of chloroform, there are added dropwise and while stirring and cooling, 42.0 parts of diethylacetyl chloride, after which the solution is stirred for a further 2½ hours without cooling, then cooled to 0°, washed with ice cold aqueous caustic soda solution of 20% strength, dried over sodium sulfate, and evaporated under reduced pressure. The residue from the evaporation is fractionated in a high vacuum (0.4 mm. Hg): after a preliminary distillate passes over, ω-(1-methyl - piperidyl - 4) - ω - diethylacetyl - ω' - isopropylidene-hydrazine distils over at 130–132° under the said pressure of 0.4 mm. Hg and is collected.

20.72 parts of the so-obtained isopropylidene compound are dissolved in 100 parts of by volume of 90% ethanol, after which hydrogen chloride is passed into the solution, while cooling with ice, until a strong acid reaction to Congo paper is obtained. After standing for one hour at room temperature, the solution is evaporated (water-bath temperature 40°), whereupon a thick oil remains behind. This oil is taken up in chloroform, and the free base liberated therefrom by the addition of ice cold, NaCl-saturated, aqueous caustic soda solution of 20% strength. The chloroform layer is dried over sodium sulfate and is then evaporated under reduced pressure. The residue from this evaporation is recrystallized from ether-petroleum ether. The so-obtained pure ω-(1-methyl-piperidyl-4)-ω-diethylacetyl-hydrazine melts at 121–124°.

Example 3

100 parts of (1-methyl-piperidyl-4)-hydrazine are dissolved in 300 parts by volume of acetone, while cooling, after which the solution is heated to boiling under reflux for ½ hour. Evaporation of the solution then yields ω - (1 - methyl - piperidyl - 4) - ω' - isopropylidene - hydrazine in quantitative yield. On cooling, the said compound crystallizes out in the form of needles. The compound can be distilled and boils at 68–70° under a pressure of 0.3 mm. Hg. Acylation of the so-obtained crude compound can be directly effected, i.e. without further purification thereof.

For acylation, a solution of 50.95 parts of trimethylacetyl chloride in 50 parts by volume is gradually added, while stirring and cooling (interior temperature 0–5°), to a solution of 71.5 parts of ω-(1-methyl-piperidyl-4)-ω'-isopropylidene-hydrazine in 300 parts by volume of chloroform. Upon completion of the addition, the solution is further stirred for 5 hours at room temperature, then shaken out with ice-cold, NaCl-saturated, aqueous caustic soda solution, dried over sodium sulfate, and evaporated to dryness under reduced pressure. The oily residue which is thus obtained is distilled under a high vacuum (pressure of 0.4 mm. Hg), whereupon ω-(1-methyl - piperidyl - 4) - ω - trimethyl-acetyl - ω' - isopropylidene-hydrazine passes over at 139–142° under the said pressure of 0.4 mm. Hg and solidifies into crystalline form upon cooling.

58.77 parts of ω-(1-methyl-piperidyl-4)-ω-trimethylacetyl-ω'-isopropylidene-hydrazine thus obtained are dissolved in 300 parts by volume of 90% ethanol, and hydrogen chloride is passed into the solution, while cooling with ice, until a reaction acid to Congo is achieved. The solution is then allowed to stand for one hour at room temperature and is evaporated under reduced pressure, whereupon the hydrochloride crystallizes out. The residue is taken up in chloroform, and the chloroform solution shaken out with NaCl-saturated aqueous caustic soda solution of 20% strength, which has been cooled to −5°, after which the solution is dried over sodium sulfate and evaporated to dryness under reduced pressure. The resultant crystalline residue is recrystallized from ether. The so - obtained ω - (1 - methyl-piperidyl-4)-ω-trimethylacetyl-hydrazine crystallizes in the form of shiny leaflets and melts at 120–122°.

Example 4

59.3 parts of n-propionyl chloride are stirred dropwise at 0° into a solution of 99.35 parts of ω-(1-methyl-piperidyl-4)-ω'-isopropylidene-hydrazine in 250 parts by volume of chloroform. Upon completion of the addition of the n-propionyl chloride, stirring of the solution is continued for three more hours at room temperature. Working up of the solution is carried out after the manner described in Example 3. The resultant ω-(1-methyl-piperidyl - 4) - ω-n-propionyl-ω'-isopropylidene-hydrazine distils at 125–128° under a pressure of 0.3 mm. Hg.

107.34 parts of the so-obtained ω-(1-methyl-piperidyl-4) - ω - n-propionyl-ω'-isopropylidene-hydrazine are dissolved in 500 parts by volume of 90% ethanol, and then hydrolysis and working up effected after the manner described in Example 3. The obtained crystalline residue —ω - (1 - methyl--piperidyl-4)-ω-n-propionyl-hydrazine— is recrystallized from an ether-methylene chloride-petroleum ether mixture, whereupon it melts at 94–96°.

Example 5

70.5 parts of n-butyric acid chloride are stirred dropwise at 0° into a solution of 101.1 parts of ω-(1methyl-piperidyl-4)-ω'-isopropylidene-hydrazine in 300 parts by volume of chloroform. Upon completion of the addition of the chloride, stirring of the solution is continued for four more hours at room temperature. Further procedure is as described in Example 3. The so-obtained ω - (1 - methyl-piperidyl-4)-ω-n-butyryl-ω'-isopropylidene-hydrazine distils at 132–133° under a pressure 0.35 mm. Hg.

100.32 parts of the thus-prepared ω-(1-methyl-piperidyl-4)-n-butyryl-ω'-isopropylidene-hydrazine are dissolved in 500 parts by volume of 90% ethanol, and hydrolysis and working up carried out after the manner described in Example 3. The obtained crystalline residue —ω-(1-methylpiperidyl-4)-ω-n-butyryl-hydrazine— is recrystallized from ether-petroleum ether, whereupon it melts at 66°.

Example 6

20.0 parts of (1-isopropyl-piperidyl-4)-hydrazine dihydrochloride are added to a solution of 4.0 parts of sodium in 50 parts by volume of methanol, and the mixture is heated to boiling under reflux for ½ hour, with stirring. Thereupon, while cooling, 40 parts by volume of acetone are added dropwise, and the mixture is again heated to boiling, with stirring, for ½ hour. After being cooled with ice, the precipitated sodium chloride is filtered off from the reaction mixture, and the filtrate is evaporated under reduced pressure. The resultant oily residue is fractionated in a high vacuum (pressure of 0.8 mm. Hg). The so-obtained ω-(1-isopropyl-piperidyl-4)-ω'-isopropylidene-hydrazine distils at 70–105°/0.8 mm. and solidifies in crystalline form in the condenser.

A solution of 3.49 parts by volume of acetyl chloride in 10 parts by volume of chloroform is stirred dropwise, while cooling (internal temperature of 0–10°), into a solution of 9.49 parts of ω-(1-isopropyl-piperidyl-4)-ω'-isopropylidene-hydrazine in 50 parts by volume of chloroform. Upon completion of the addition, the mixture is further stirred at room temperature for 3 hours, after which it is shaken out with aqueous caustic soda (20% strength) which is saturated with sodium chloride and has been cooled to −10°, then dried over sodium sulfate and evaporated under reduced pressure. The resultant residue is fractionated in a high vacuum (pressure of 0.4 mm. Hg), whereupon ω-(1-isopropyl-piperidyl-4)-ω-acetyl-ω'-isopropylidene-hydrazine distils at 133–135°/0.4 mm.

10.38 parts of ω-(1-isopropyl-piperidyl-4)-ω-acetyl-ω'-isopropylidene-hydrazine are dissolved in 50 parts by volume of 90% ethanol, and hydrogen chloride is passed into the solution, while cooling with ice, until a strong acid reaction on Congo paper is achieved. After being allowed to stand for one hour at room temperature, the solution is evaporated almost to dryness under reduced pressure (12 mm. Hg) and at a bath temperature of 40–50°, after which the residue is taken up in methylene chloride, the methylene chloride solution shaken out with aqueous caustic soda solution (20% strength) which has been saturated with NaCl and cooled to −10°, and the methylene solution then dried over sodium sulfate and evaporated under reduced pressure. The so-obtained crystalline product, ω-(1-isopropyl-piperidyl-4)-ω-acetyl-hydrazine, is recrystallized from ether-petroleum ether to yield needles which melt at 86–87°.

Example 7

20.0 parts of (1-ethyl-piperidyl-4)-hydrazine dihydrochloride are added to a solution of 4.25 parts of sodium in 50 parts by volume of methanol, and the mixture is heated to boiling under reflux for 1 hour, with stirring. Thereupon, while cooling, 40 parts by volume of acetone are added dropwise, and the mixture is again heated to boiling for ½ hour, with continued stirring. After being cooled with ice, the precipitated sodium chloride is filtered off from the reaction mixture, and the filtrate is evaporated under reduced pressure. The so-obtained residue is dissolved in ether, and the solution dried over sodium sulfate and evaporated to dryness under reduced pressure, whereby ω-(1-ethyl-piperidyl-4)-ω'-isopropylidene-hydrazine is obtained in solid crystalline form.

A solution of 6.45 parts by volume of acetyl chloride in 20 parts by volume of methylene chloride is stirred dropwise, and while cooling to an internal temperature of 0–10°, into a solution of 16.31 parts of ω-(1-ethyl-piperidyl-4)-ω'-isopropylidene-hydrazine in 100 parts by volume of methylene chloride. Upon completion of the addition, stirring is continued for 3 more hours at room temperature. The mixture is worked up as in the preceding example. The so-prepared ω-(1-ethyl-piperidyl-4)-ω-acetyl-ω'-isopropylidene-hydrazine distils at 106–113° at a pressure of 0.09 mm. Hg.

16.93 parts of ω-(1-ethyl-piperidyl-4)-ω-acetyl-ω'-isopropylidene-hydrazine is dissolved in 75 parts by volume of 90% ethanol, and hydrolysis and further working up effected as in the preceding example. The so-obtained crystalline residue, ω-(1-ethyl-piperidyl-4)-ω-acetyl-hydrazine, melts at 113–114° (needles) after recrystallization from ether-petroleum ether.

Example 8

A solution of 14.88 parts of n-capronic acid chloride in 25 parts by volume of methylene chloride is stirred, while cooling, into a solution of 18.73 parts of ω-(1-methyl-piperidyl-4)-ω'-isopropylidene-hydrazine, after which the mixture is stirred for 4 more hours at room temperature. Working up is effected after the manner described in Example 6, yielding ω-(1-methyl-piperidyl-4)-ω-n-caproyl-ω'-isopropylidene-hydrazine (boiling point 128–133° under a pressure of 0.03 mm. Hg). 20.44 parts of the last-named compound are dissolved in 100 parts by volume of 90% ethanol, and hydrolysis and further working carried out after the manner described in Example 6. The so-obtained crystalline residue, ω-(1-methyl-piperidyl-4)-ω-n-caproyl-hydrazine, melts at 84–85° (felted needles) after recrystallization from ether-petroleum ether.

(NOTE.—The term "n-capronic acid chloride"—also sometimes termed "n-caproic acid chloride"—refers to normal-$CH_3(CH_2)_4COCl$. The term "n-caproyl-" refers to the corresponding n-$C_5H_{11}CO$— group.)

Example 9

100 parts of (1-methyl-piperidyl-4)-hydrazine are dissolved with cooling in 300 parts by volume of acetone, and the solution is heated to the boil under reflux for ½ hour. Evaporation of the solution in a vacuum yields the ω-(1-methyl-piperidyl-4)-ω'-isopropylidene-hydrazine in quantitative yield. On cooling it crystallises as needles. The compound can be distilled and boils at 68–70°/0.3 mm. Hg. For acylation, however, the unpurified crystalline product can be used directly.

A solution of 31.1 parts of ω-(1-methyl-piperidyl-4)-ω'-isopropylidene-hydrazine in 100 parts by volume of methylene chloride is treated dropwise with stirring and cooling (inside temperature 0–10°) with a solution of 28.83 parts of chloroformic acid phenyl ester in 30 parts by volume of methylene chloride. After the addition is completed, the solution is stirred at room temperature for a further 2 hours, then shaken out with a caustic soda solution cooled to −10° and saturated with common salt, dried over sodium sulfate and evaporated down in a vacuum. The residue so obtained is distilled in a high vacuum whereby the ω-(1-methyl-piperidyl-4)-ω-carbophenoxy-ω'-isopropylidene-hydrazine distils over at 0.2 mm. Hg at 132–139°.

16.12 parts of ω-(1-methyl-piperidyl-4)-ω-carbophenoxy-ω'-isopropylidene-hydrazine are dissolved in 75 parts by volume of 90% ethanol and hydrogen chloride is introduced into the solution until the reaction is acid to Congo. The solution is then allowed to stand for 1 hour at room temperature and thereupon concentrated almost to dryness in a vacuum at a bath temperature of 40°. The residue so obtained is taken up in chloroform, the chloroform solution shaken out with a 20% caustic soda solution cooled to −10° and saturated with common salt, dried over sodium sulfate and evaporated to dryness in a vacuum. The crystalline residue so obtained is recrystallized from a mixture of ether and petroleum ether. Pure ω-(1-methyl-piperidyl-4)-ω-carbophenoxy-hydrazine melts at 79–80°.

Example 10

A solution of 29.25 parts of ω-(1-methyl-piperidyl-4)-ω'-isopropylidene hydrazine (preparation as in Example 9) in 100 parts by volume of chloroform is treated dropwise with stirring at 0° with 24.25 parts of benzoyl chloride. After the addition is completed the solution is allowed to stand at room temperature for a further hour. The working up is carried out as described in Example 9. The ω-(1-methyl-piperidyl-4)-ω-benzoyl-ω'-isopropylidene-hydrazine distils in a high vacuum at 0.004 mm. Hg at a bath temperature of 145°.

27.4 parts of ω-(1-methyl-piperidyl-4)-ω-benzoyl-ω'-isopropylidene-hydrazine are dissolved in 250 parts by volume of 90% ethanol and hydrolysed and worked up as described in Example 9. The crystalline residue, the ω-(1-methyl-piperidyl-4)-ω-benzoyl-hydrazine, is recrystallized from benzene. M.P. 146–148°.

*Example 11*

A solution of 3.39 parts of ω-(1-methyl-piperidyl-4)-ω'-isopropylidene-hydrazine (preparation as in Example 9) in 100 parts by volume of methylene chloride is treated with stirring and cooling (inside temperature 0–10°) drop by drop with a solution of 4.93 parts of benzylsalicylic acid chloride in 30 parts by volume of methylene chloride. After the addition is completed, the mixture is stirred for a further 3½ hours at room temperature, then shaken out with an ice-cold 20% caustic soda solution saturated with common salt, dried over sodium sulfate and evaporated down in a vacuum. The oily residue is fractionated in a high vacuum whereby the ω-(1-methyl-piperidyl-4)-ω-benzyl-salicoyl-ω'-isopropylidene-hydrazine distils over at an air bath temperature of 210–240°.

60 parts of ω-(1-methyl-piperidyl-4)-ω-benzyl-salicoyl-ω-isopropylidene-hydrazine are dissolved in 35 parts by volume of 90% ethanol and hydrogen chloride is introduced into the solution with cooling until it shows an acid reaction to Congo. Thereupon the solution is allowed to stand at room temperature for 1 hour and then evaporated to dryness in a vacuum. The residue is taken up in chloroform, the chloroform solution is shaken out with a 20% caustic soda solution cooled to −5° and saturated with common salt, dried over sodium sulfate and evaporated down in a vacuum. The oily residue is distilled in a high vacuum whereby the ω-(1-methyl-piperidyl-4)-ω-benzyl-salicoyl-hydrazine distils over at an air bath temperature of 270°.

The starting materials are prepared according to the Belgian Patent No. 553,994: An N-alkyl-4-piperidone, for example N-methyl-4-piperidone or N-ethyl-4-piperidone is condensed with an acyl-hydrazine, the so obtained N-alkyl-4-piperidone-acyl-hydrazone is hydrogenated and the acyl group split off.

The present application is in part a continuation of copending application Serial No. 738,038, filed May 27, 1958, now abandoned.

Having thus disclosed the invention what is claimed is:

1. A compound of the formula

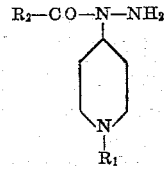

wherein $R_1$ represents lower alkyl, and $R_2$ is a member selected from the group consisting of methly, ethyl, n-propyl, tert. butyl, n-pentyl-(1), n-pentyl-(3), phenyl, phenoxy and 2-benzyloxyphenyl.

2. ω-(1-methyl-piperidyl-4)-ω-acetyl-hydrazine.
3. ω-(1-methyl-piperidyl-4)-ω-n-butyryl-hydrazine.
4. ω-(1-isopropyl-piperidyl-4)-ω-acetyl-hydrazine.
5. ω-(1-ethyl-piperidyl-4)-ω-acetyl-hydrazine.
6. ω(1-methyl-piperidyl-4)-ω-n-caproyl-hydrazine.

No references cited.